Feb. 9, 1926.  
M. MUELLER  
1,572,028  
SHAPING AND TRIMMING ATTACHMENT FOR TILE FORMING MACHINES  
Filed August 13, 1924   4 Sheets-Sheet 2
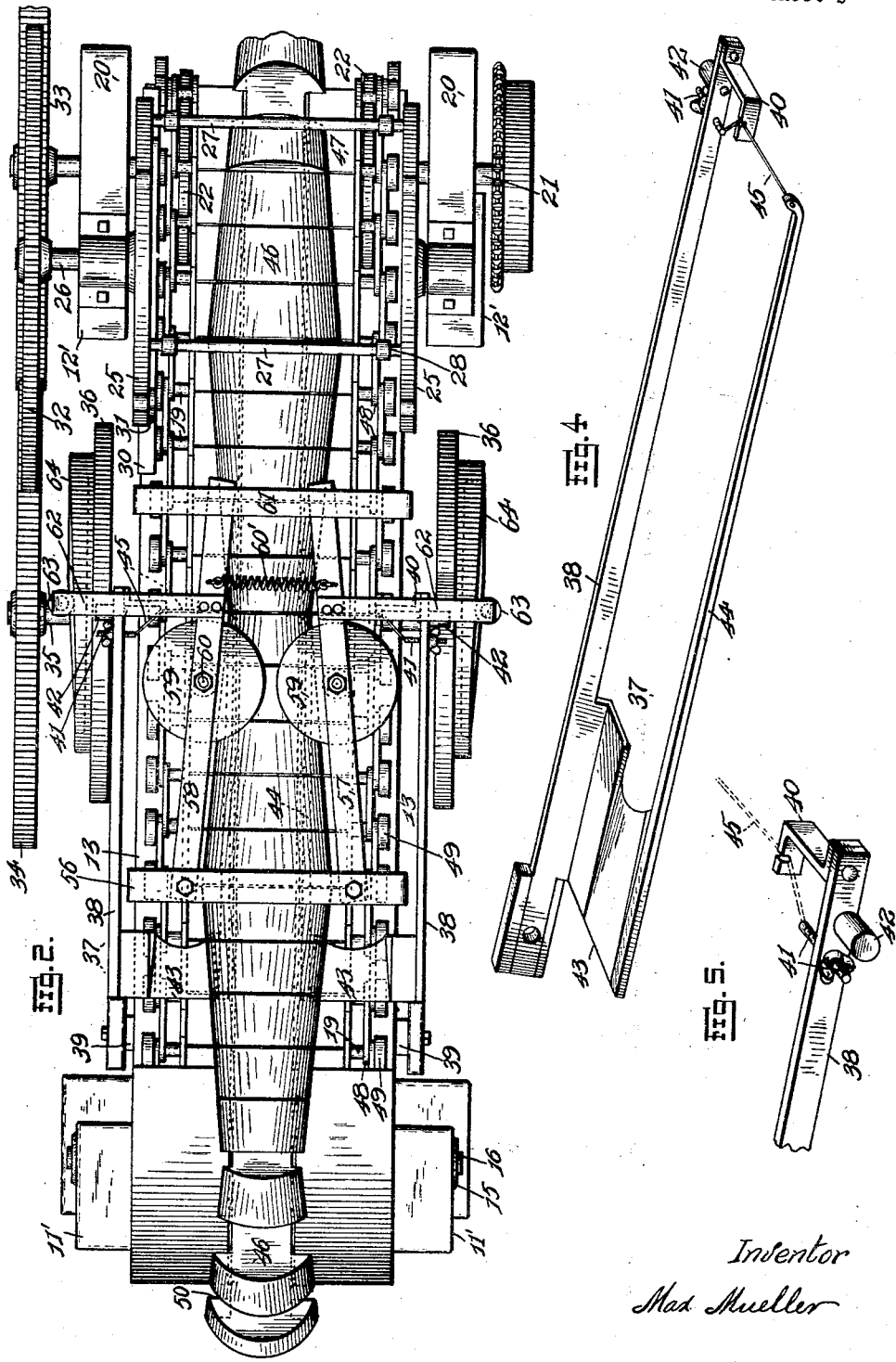
Inventor  
Max Mueller

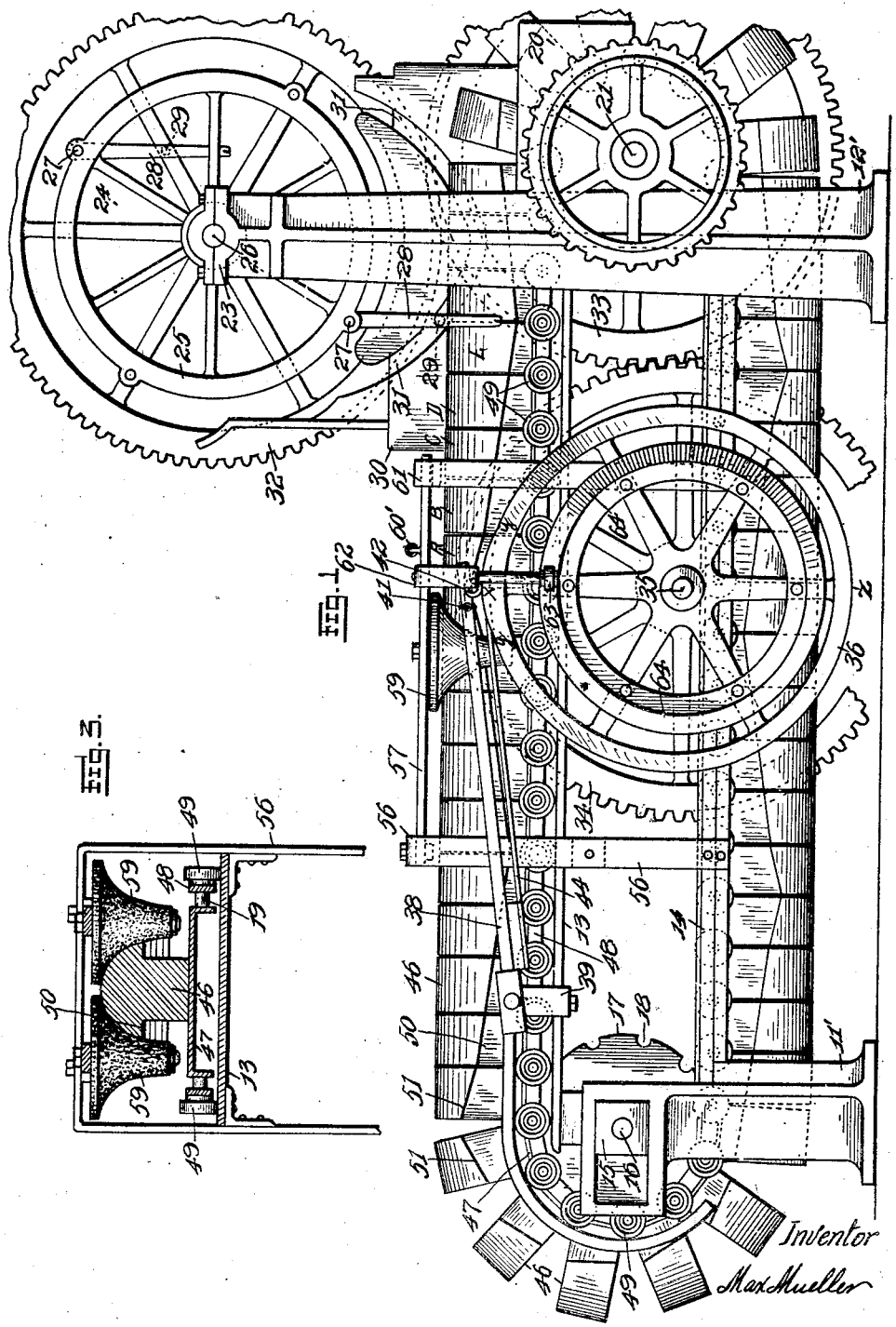

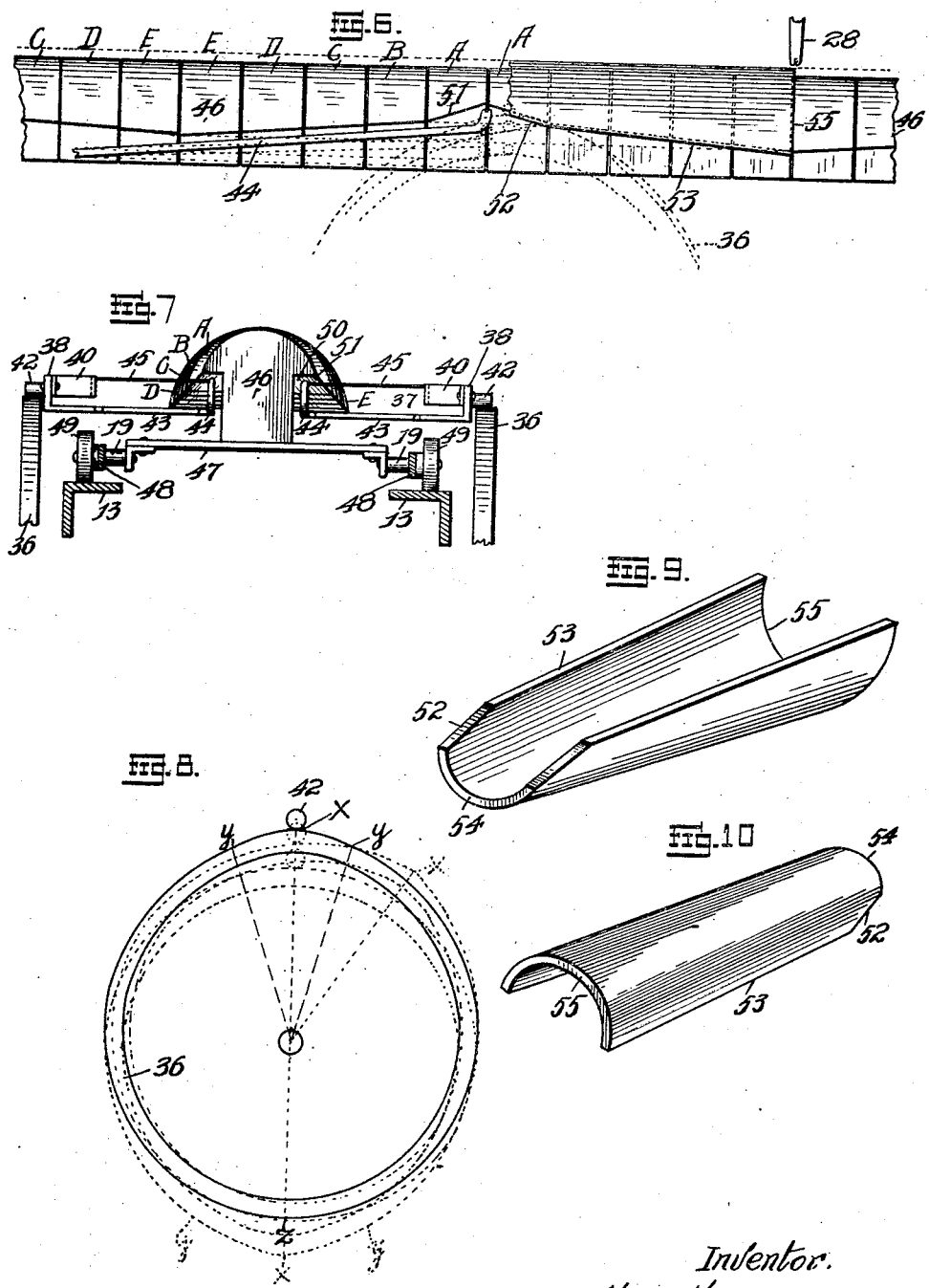

Feb. 9, 1926.
M. MUELLER
1,572,028
SHAPING AND TRIMMING ATTACHMENT FOR TILE FORMING MACHINES
Filed August 13, 1924   4 Sheets-Sheet 4
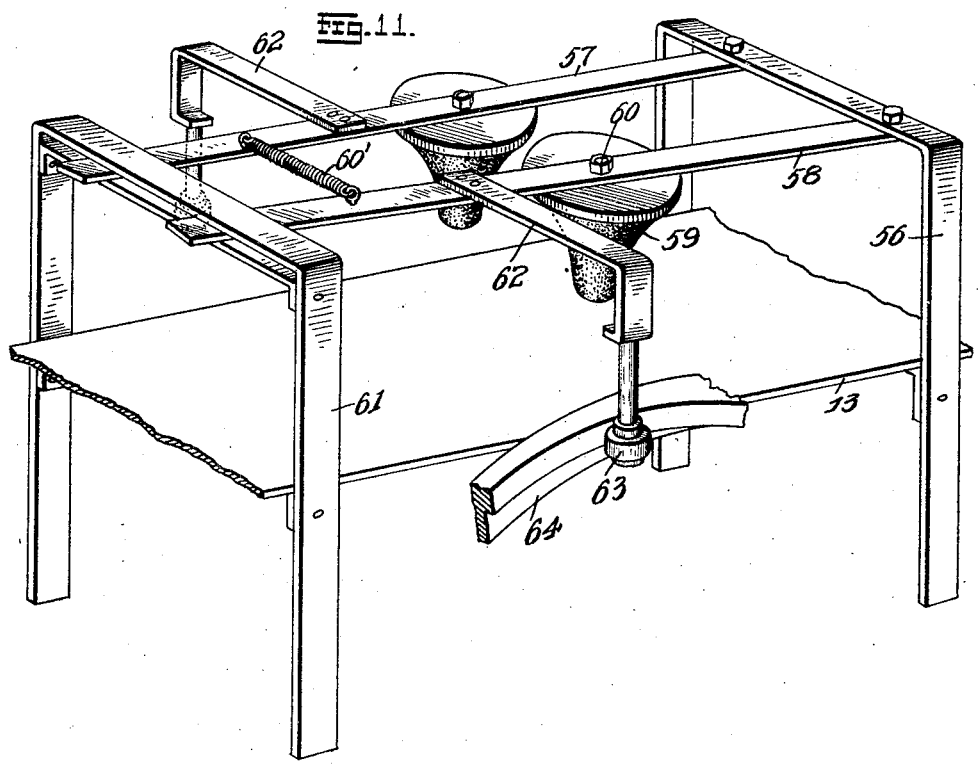
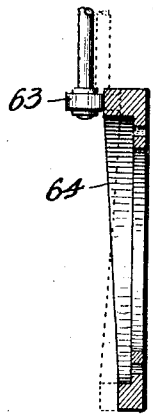
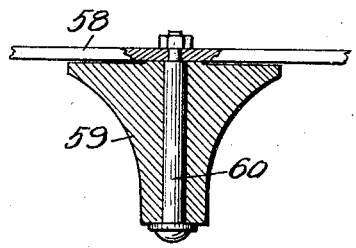
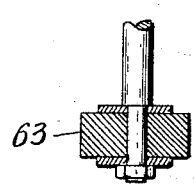
Inventor
Max Mueller Patented Feb. 9, 1926.

1,572,028

UNITED STATES PATENT OFFICE.

MAX MUELLER, OF ST. LOUIS, MISSOURI, ASSIGNOR TO LOS ANGELES PRESSED BRICK COMPANY, OF LOS ANGELES, CALIFORNIA, A CORPORATION.

SHAPING AND TRIMMING ATTACHMENT FOR TILE-FORMING MACHINES.

Application filed August 13, 1924. Serial No. 731,854.

*To all whom it may concern:*

Be it known that I, MAX MUELLER, a citizen of the United States, and resident of St. Louis, Missouri, have invented certain new and useful Improvements in a Shaping and Trimming Attachment for Tile-Forming Machines, of which the following is a specification.

This invention relates to improvements in a shaping and trimming attachment for tile forming machines of the class used in the manufacture of clay products, and it has for its object a means attached to a machine equipped with an endless conveyor or table placed in movement by the clay column as it comes from the die of the column forming machine positioned relative to the forming, trimming and cutting machine, permitting the clay column to contact with the conveyor, moving it at the same speed as the ejected clay column, and the attachments operating in unison during the travel for shaping, trimming and cutting off the column in predetermined uniform lengths.

The essential features of my invention are the forming blocks carried by the endless conveyor or table, the shaping means for pressing the clay against the blocks, and the under edge trimming mechanism by which the bottom edges are properly and accurately cut during the movement of the machine, thus producing a tile of the tapered mission style, each of uniform shape and length.

The machine in general is not a part of the invention as other applications embodying the machine structure in general are now pending in the United States Patent Office, and on which I have made application for Letters Patent, and in order not to conflict with the same I am, in this application, making claim only to the attachment for fabricating tapered mission tile, i. e. the forming blocks on the conveyor, the presser mechanism and trimming mechanism all operating in conjunction with the machine to function at the proper period.

The attachments in this connection are very simple, extremely unique, and function with perfect accuracy.

Figure 1, is a side elevation of a clay products fabricating machine, showing my improved attachments applied thereto.

Figure 2, is a top plan view of the same.

Figure 3, is a detail cross sectional view of the presser attachments made use of.

Figure 4, is a detailed perspective view of one of the trimming frames made use of.

Figure 5, is a detailed perspective view of one end of the trimming frame showing the cam operated roller, and the cutting wire tightener.

Figure 6, is a detailed side elevation of the forming blocks with the trimming attachment in relative position for shaping the bottom edges of the tile.

Figure 7, is a cross sectional view of the machine frame and end view of the forming blocks and trimming mechanism in their relative position.

Figure 8, is a diagrammatic view of one of the cams used for operating the trimming mechanism, showing its various positions by dotted lines.

Figures 9 and 10, are perspective views of the finished tile.

Figure 11, is a detailed perspective view of the combined presser and shaping mechanism detached from the machine.

Figure 12, is a detailed sectional view of one of the side face cams used for operating the presser mechanism.

Figure 13, is an enlarged detailed sectional view of one of the presser rollers or heads.

Figure 14, is a detailed sectional view of one of the cam operated rollers used in conjunction with the operation of the presser mechanism.

I will now describe the general construction of the machine with the improved attachments as illustrated in the accompanying drawings, to the precise shape of which I do not desire to limit myself as the blocks may be shaped to correspond with the style and size of tile to be made.

The machine itself, as illustrated, consists of a frame composed of standards 11' and 12', by which are supported runways or tracks, 13, and a guard, 14.

On the standards, 11', are adjustable journal bearings blocks, 15, in which is supported a shaft, 16, to which is attached ratchet discs, 17, the periphery of which are provided with depressions, 18, arranged at intervals to correspond with and accommodate the reception of hubs, 19, of the table sections.

On the standards, 12', are journal brackets, 20, supporting a shaft, 21, also equipped with sprocket discs, 22, constructed the same as the discs, 17, located on the opposite end of the machine frame.

On top of the standards, 12', are journals, 23, in which is rotatably mounted a drum, 24, constructed preferably of skeleton formation, and consisting of two side rims or wheels, 25, provided with spokes terminating to hubs from which project trunnions, 26, having bearing in the journals, 23. The two wheels, 24, are connected together by cross rods or shafts, 27, to which are supended arms, 28, forming a cutting yoke, the free ends supporting a cutting wire which cuts the clay product into proper uniform lengths.

On one of each set of arms, 28, is a roller, 29, which is designed to guide the yoke during its travel, permitting the cutting wires to enter and remove from the clay during the cutting off process.

To one side of the frame is a siding consisting preferably of a plate, 30, its inner surface equipped with a guide or cam groove, 31, in which the rollers, 29, travel during the cutting off process.

On one of the trunnions, 26, is a gear wheel, 32, meshing with a gear wheel, 33, mounted on the shaft, 21, and it in turn meshes with a gear wheel, 34, mounted on a shaft, 35. On this shaft is also mounted cam wheels, 36, which regulate the position of the trimming mechanism composed of two frames, one mounted on each side of the machine frame.

The trimming mechanism consists of a frame, 37, (see Figure 4) composed of an outer arm, 38, pivotably mounted on a bracket, 39, secured to the machine frame. The free end of the arm, 38, has a cutting wire support, 40, a wire tightening screw, 41, and a roller, 42, said roller riding on the periphery of the cam wheel, 36. The frame also has a flattened extension, 43, terminating into an arm, 44, its free end being slightly upturned and to which is securely fastened one end of a cutting or trimming wire, 45.

These trimming members are located on the machine frame, one on each side of the endless conveyor, and the arms, 44, extend under the sectional forming blocks, 46, mounted on and carried by the sections comprising the endless table.

The endless conveyor or table consists of a plurality of sections, 47, connected together by links, 48, equipped with hubs, 19, and wheels, 49, these wheels riding on the tracks, 13. To each of these sections is attached one of the forming blocks, 46, the outer surface or head of the blocks shaped to the required design of tile to be formed, in this instance five of the blocks constitute a length of tile, its block "A" being the smallest in circumference and is cut under forming a shoulder as indicated by the numeral, 50, its cut under edge being formed on an abrupt angle, 51, so as to form the edge, 52, of the finished tile, (see Figures 9 and 10).

The following block "B" has a gradually increasing circumference with a slight tapered under cut, and so on blocks "C"—"D" and "E" gradually increase in size with a continuing tapered under cut. The exact shape of the blocks are clearly illustrated by side and plan view in Figures 1, 2, 6 and 7.

The undercut position of the blocks accommodates the positioning of the arms, 44, of the trimming frames, and the upturned ends in close contact with the under cut surface, thus bringing the cutting wire, 45, in close proximity with the tapered or slanting edge for trimming the edge, 53 of the tile.

The end edges, 54 and 55, of the clay are vertically cut by the drum cutting mechanism located at the fore end of the machine.

On the machine frame is mounted a yoke shaped bracket, 56, to the horizontal portion thereof are pivotally mounted two levers, 57 and 58. These levers are provided with shaper heads, 59, in the form of rollers and supported on spindles, 60.

These heads are shaped to correspond with and conform to the outer contour of the blocks, 46, and positioned to contact with the top and sides thereof, and as the semi-circular clay mass advances from the die of a separate machine, it contacts with the blocks automatically advancing, the endless conveyor permitting the clay to contact with the periphery of the roller presser heads, and by means of a spring, 60', the heads are held against the clay under pressure.

The levers, 57 and 58, are held in horizontal position and guided laterally by the bracket, 61. On each of the arms, 57 and 58, is an extending arm, 62, each carrying a roller, 63. These rollers are arranged to mesh with a side face cam, 64, attached to the cam wheels, 36, and during the rotation of said cams the presser heads are gradually spread by the roller, 63, riding on the high point of the cam, 64, and the heads are automatically brought inwardly by means of the spring, 60', when the roller rides towards the lowest point of the cam.

When the machine is once started, it continues so long as the material continues to feed to the table.

The cam wheels, 36, control the trimming mechanism, the highest part of the cam being at "X", the next highest part at "Y", and it then continues on a gradual decrease to the lowest point "Z". By the movement of the cams the rollers, 42, assume a position as shown by dotted lines in Figures 6 and 8, thus the trimming wires, 45, are gradually raised and lowered during the operation of the machine to form the edges 52 and 53 of the tile.

The operation of my invention is as follows: The machine is placed immediately in front of the clay discharging die, and as the semi-circular column of clay is discharging, it comes in contact with the forming blocks, 46, moving the endless carrier or conveyor in the direction of the arrow, see Figure 1. The roller heads, 59, contact with the clay, the pressure of the heads on the soft clay molds or shapes it against the outer contour of the blocks, giving the clay the proper form.

The clay still continues to advance and as it passes on beyond the heads, the lower edge contacts with the trimming wires, 45, the height of which is controlled by the side cams, 36.

After the formed and trimmed column advances, it is cut into uniform lengths by the cutting drum, 24, which carries cutting wires supported in yokes suspended therefrom.

The cams and cutting drum are so geared as to move at the same speed and the mechanism is rotated by the shaft, 21, manipulated by the movement of the table. In other words, the machine is placed in operation by the movement of the clay column on the table and its pressure is attained by the delivery machine.

Having fully described my invention, what I claim is:

1. A shaping and trimming attachment for tile forming machines, comprising a plurality of forming blocks mounted on an endless conveyor, a pressing mechanism in close proximity with the blocks, a trimming mechanism for trimming the bottom edges of the product, means for controlling the elevation of the trimming means, and a cutting off mechanism.

2. A shaping and trimming attachment for tile forming machines, comprising an endless conveyor mounted on a frame, forming blocks carried by the conveyor, said blocks shaped to form a tile of predetermined design, presser members in close proximity with the blocks and to be brought in contact therewith to shape the clay to the blocks, a trimming mechanism for trimming and shaping the lower edges of the tile, cams for controlling the elevation of the trimming mechanism in combination with a cutting off mechanism for cutting the formed and trimmed material into equal lengths.

3. A clay products machine, comprising an endless sectional forming table, presser heads positioned to shape the clay on the table, a trimming mechanism for trimming the bottom edges, a means for elevating the trimming mechanism in combination with a gearing mechanism for placing the elements in operation.

4. In a clay products forming machine comprising a frame, an endless conveyor mounted therein, sectional forming blocks carried thereby, and a bottom edge trimming mechanism for trimming the product at its required shape simultaneously with the moving product.

5. In a clay products forming machine, comprising a frame, an endless conveyor mounted therein, and an under trimming mechanism in close proximity with said conveyor, for trimming the product at a predetermined shape during the movement of the product.

6. In a clay products forming machine, comprising a frame, an endless conveyor mounted therein, presser heads positioned in close proximity with the conveyor for pressing the clay against the blocks as it travels with the table, and a trimming mechanism for trimming the under edge of the formed clay to correspond to the shape of the under side of the forming blocks.

7. In a clay products forming machine, comprising a frame, an endless conveyor located therein, sectional forming blocks mounted on the conveyor, a trimming mechanism mounted on the frame and positioned in close proximity with the forming blocks, and cams for elevating said trimming mechanism to cut the bottom edges at the required slant.

8. A clay products forming machine, comprising an endless sectional forming block conveyor supported in a frame, a mechanism for contacting with the clay and shaping it to the outer contour of the forming blocks, means for regulating the movement of the first mentioned mechanism, a trimming mechanism, a means for operating the same, and a cutting off mechanism.

In testimony whereof I have signed my name to this specification.

MAX MUELLER.